United States Patent
Weber et al.

(10) Patent No.: US 8,081,430 B2
(45) Date of Patent: *Dec. 20, 2011

(54) MICROPERFORATED AND BACKLIT DISPLAYS HAVING ALTERNATIVE DISPLAY CAPABILITIES

(75) Inventors: Douglas Weber, Arcadia, CA (US); Naoto Matsuyuki, Okazaki (JP)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/833,920

(22) Filed: Jul. 9, 2010

(65) Prior Publication Data
US 2010/0271767 A1   Oct. 28, 2010

Related U.S. Application Data

(63) Continuation of application No. 12/242,658, filed on Sep. 30, 2008, now Pat. No. 7,778,015.

(60) Provisional application No. 61/080,155, filed on Jul. 11, 2008.

(51) Int. Cl.
*H05K 5/00* (2006.01)
*H05K 7/00* (2006.01)

(52) U.S. Cl. ......... 361/679.02; 361/679.21; 340/815.53; 340/815.54

(58) Field of Classification Search ............. 361/679.02, 361/679.21, 679.26, 679.55; 345/204; 250/227.26; 340/815.53, 815.54
See application file for complete search history.

(56) References Cited

U.S. PATENT DOCUMENTS

| 6,357,887 | B1 | 3/2002 | Novak |
| 6,977,808 | B2 | 12/2005 | Lam et al. |
| 7,113,196 | B2 | 9/2006 | Kerr |
| 7,334,362 | B2 | 2/2008 | Bladt |
| 7,452,098 | B2 | 11/2008 | Kerr |
| 2008/0024470 | A1 | 1/2008 | Andre et al. |
| 2008/0084404 | A1* | 4/2008 | Andre et al. ................... 345/204 |
| 2008/0309511 | A1* | 12/2008 | Kerr et al. ................ 340/815.53 |
| 2009/0040790 | A1 | 2/2009 | Payne |

FOREIGN PATENT DOCUMENTS

| JP | 7-271309 | 10/1995 |
| JP | 2002-23670 | 1/2002 |
| JP | 2002-40952 | 2/2002 |

* cited by examiner

*Primary Examiner* — Anthony Haughton
(74) *Attorney, Agent, or Firm* — Beyer Law Group LLP

(57) ABSTRACT

A visual display having microperforations, backlighting and contrasting surface finishes is disclosed. The visual display includes an opaque base object having a front surface and a plurality of microperforations therethrough from the front surface to a back surface. Each microperforation has a diameter of about 100 microns or less, and numerous microperforations are arranged into an overall pattern, such as a logo, text or advertisement. A light source placed proximate to the back surface passes light through the microperforations to be visible at the front surface, such that the overall pattern can be visibly perceived when the light source is turned on. A contrasting surface finish formed on the front surface includes at least two visibly distinguishable shades, with one shade covering at least a portion of the front surface defined by the overall pattern, such that the overall pattern can be seen when the light source is turned off.

20 Claims, 6 Drawing Sheets

A-A

MICROPERFORATED AND BACKLIT DISPLAYS HAVING ALTERNATIVE DISPLAY CAPABILITIES

CROSS REFERENCE TO RELATED APPLICATION

This application claims priority to co-pending and commonly owned U.S. patent application Ser. No. 12/242,658, filed Sep. 30, 2008, which in turn claims priority to U.S. Provisional Patent Application No. 61/080,155, filed Jul. 11, 2008, both of which are entitled "MICROPERFORATED AND BACKLIT DISPLAYS HAVING ALTERNATIVE DISPLAY CAPABILITIES," and both of which are incorporated by reference herein in their entireties and for all purposes.

TECHNICAL FIELD

The present invention relates generally to visual displays, and more particularly to the use of aesthetically pleasing visual displays that can be backlit.

BACKGROUND

Sophisticated computers, televisions, appliances and other electronic devices are developing at a rapid rate. There is an ever-present demand for improved appearance, improved functionality, and improved aesthetics in the newest devices. One area that continually receives great attention for improvement in such devices includes user displays, lights and other visual indicators. Providing crisp, attractive, unambiguous, and intuitively friendly displays, lights and other visual indicators for a user is very important in many electronic devices and other consumer products. As consumer products become smaller and more complex, however, it becomes increasingly difficult to present displays, lights and other visual indicators for a user in a manner that is readily understandable, yet uncluttered and aesthetically pleasing.

Much of the aesthetic appeal of an electronic device or other consumer product can quickly be compromised if there are too many display elements, lights and indicators, or if too much of the visible display area is occupied by display elements that are not needed or relevant at all times. When not needed, these "passive" or unactivated visual display elements can remain perceptible to the user, even though in the "off" state. This is not only displeasing from an aesthetic standpoint, but it can be an annoying distraction that interferes with the perception and understanding of other visual display elements that are of greater importance or should be observed at a given moment.

While many designs for providing displays, lights and other visual indicators on electronic and personal devices have generally worked well in the past, there is always a desire to provide new and improved designs or techniques that result in even more aesthetically pleasing displays, lights and other visual indicators. In particular, the ability to provide displays, lights and other visual indicators on electronic and personal devices in a manner that can conserve space and reduce visual clutter is desired, particularly where such displays, lights and other visual indicators have alternative capabilities.

SUMMARY

It is an advantage of the present invention to provide an aesthetically pleasing backlit display having alternative display capabilities, particularly for use with an electronic or other personal device. This can be accomplished at least in part through the use of a base object having a matrix or other formation of microperforations formed therein and arranged into an overall visible pattern, such that a light source providing light therethrough can be perceived by a user on the other side. Alternative display capabilities can include the ability of the visible pattern to be readily perceived by the user even when the light source is turned off.

In various embodiments of the present invention, a visual display can include a base object having front and back surfaces on opposing sides as well as a plurality of microperforations therethrough, a light source, and a contrasting surface finish formed on the front surface. The base object can be an opaque material, such that light shining through the microperforations can be seen by a user on the opposite side of the light source. Each of the microperforations can have a diameter of about 100, 50, 30 or even 20 microns or less, although a diameter of about 30 microns or less is preferable. The microperforations can be arranged into an overall pattern that is discernable by a user. The light source can be placed proximate to the back surface such that light passing through the microperforations is visible to a user viewing the front surface, and such that the user can visibly perceive the overall pattern when the light source is turned on. The contrasting surface finish formed on the front surface can have a first shade and a second shade that is visually distinguishable from the first shade. The first shade can cover some or all of the front surface defined by the overall pattern, and the second shade can cover some or all of the front surface outside of that which is defined by the overall pattern, such that a user can visibly perceive the overall pattern when the light source is turned off.

In various detailed embodiments, the overall pattern can comprise a logo, a trademark, text, and/or an advertisement, among various other items. The base object can comprises a metallic object such as an aluminum or stainless steel object. The contrasting surface finish can comprise separate and different anodizations of the front surface, or can comprise separate and different platings of the front surface. Other surface treatments to distinguish the pattern when the light source is turned off are also possible. The microperforations can be filled with a clear epoxy material. Also, the light source can be a light emitting diode, a liquid crystal element, and/or an electroluminescent light, among other suitable possibilities. In some embodiments, the light source can be adapted to change colors while light is continuously emitted therefrom, for a more dynamic and aesthetically pleasing visual display.

In further embodiments of the present invention, an electronic device can include an outer housing adapted to contain one or more internal electrical device components therein, a processor located within the outer housing, one or more user interface regions in communication with the processor, and a visual display located on the outer housing. At least a portion of the outer housing can includes an opaque material having a front surface and a back surface on opposing sides thereof, and the visual display can be located on this opaque portion. The visual display can includes a plurality of microperforations from the front surface through to the back surface of the opaque portion, a light source placed proximate to the back surface, and a contrasting surface finish formed on the front surface. Further details, variations and features can be similar to the various visual display embodiments provided above. The electronic device can be a laptop, personal computer, media player or cell phone.

In still further embodiments, a method of forming a visual display is provided. Process steps can include selecting a base object composed of an opaque material and having front and back surfaces, forming a plurality of microperforations in the base object in an overall pattern such that light is able to pass therethrough, placing a mask over the front surface to mask front surface area that lies outside the overall pattern, anodizing the portion of the front surface exposed by the mask, removing the mask to reveal a front surface having at least two visibly different surface finishes, and positioning a light source proximate to the back surface. Alternatively, a plating process involving a print resistant ink can be used to form the two visibly different surface finishes on the front surface.

Again, various details and features of the visible pattern can be similar to foregoing embodiments. The light source can be positioned such that light from said light emitted therefrom passes through the microperforations and is visible to a user viewing the front surface. The overall effect is that a user can visibly perceive the light forming the overall pattern when the light source is turned on and can visibly perceive the overall pattern due to the visibly different surface finishes when the light source is turned off.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatus and method for providing microperforated and backlit display having alternative display capabilities. These drawings in no way limit any changes in form and detail that may be made to the invention by one skilled in the art without departing from the spirit and scope of the invention.

DETAILED DESCRIPTION

Figure 1A:
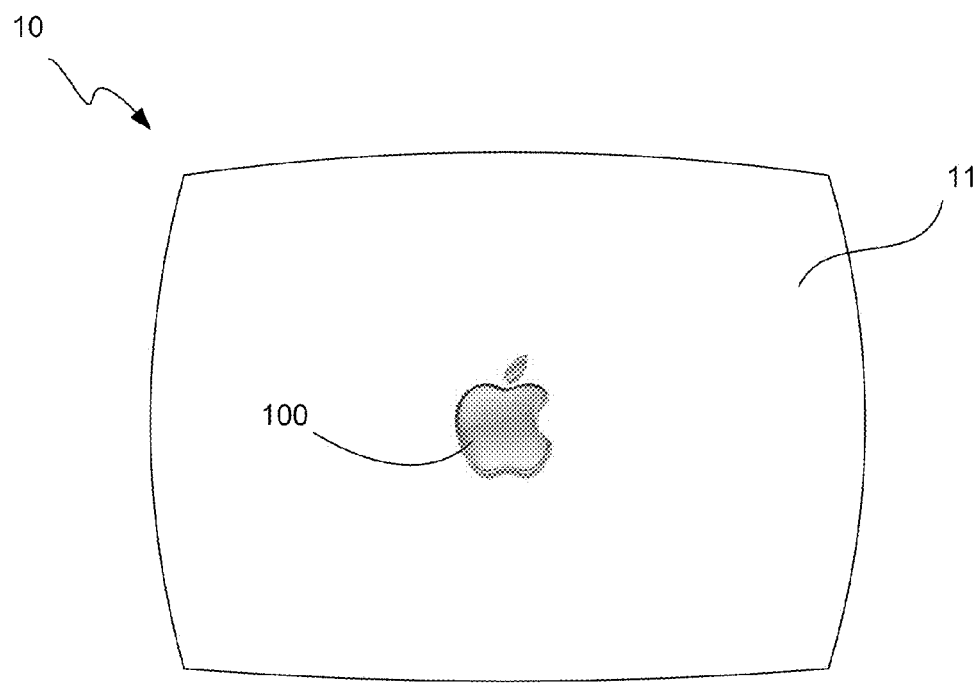
FIG. 1A illustrates in top plan view an exemplary laptop personal computer in a closed position and having a logo on its cover according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to aesthetically pleasing visual displays that can be backlit. In particular, such visual displays can include a microperforated and backlit display having alternative display capabilities. Such displays can be used on an electronic or other personal device, such as, for example, a MacBook® laptop computer, a Mac Pro® personal computer, an iPod® media player, or an iPhone® cellular telephone, all made by Apple Inc., among other suitable computers and electronic devices. Furthermore, the invention can also be used for visual displays on other items that may not be electronic devices, as will be readily appreciated, and all such other uses are specifically contemplated.

In various embodiments of the present invention, a microperforated and backlit display having alternative display capabilities is provided. Tiny holes or "microperforations" formed in a base object for such a display are preferably tiny enough so that they cannot be readily distinguished at the base material surface by the naked human eye, but are large enough so that light can pass therethrough and be seen by the naked human eye. In general, such microperforations should extend from one side of the base material to another side, such that light can be passed therethrough. Such microperforations can be about 100 microns or less in diameter, and should preferably be even smaller, such as about 30 microns or less in diameter. It is thought that a diameter of about 30 microns or less tends to result in such microperforations being "invisible" to the naked eye for most observers. In some embodiments, the microperforations can range from about 20 microns to about 50 microns in diameter. Smaller microperforation diameters can also be used, as may be desired for a particular visual display implementation.

Further details regarding such microperforations and the formation thereof into a base object can be found in commonly owned U.S. patent application Ser. Nos. 11/456,833 and 11/551,988, filed on Jul. 11, 2006, and Oct. 23, 2006 respectively, both of which are entitled "INVISIBLE, LIGHT-TRANSMISSIVE DISPLAY SYSTEM," and both of which are incorporated by reference herein in their entireties and for all purposes. Lasers used to cut such microperforations can be those manufactured by, for example, Electro Scientific Industries, Inc. of Portland, Oreg., although many other brands and makes of lasers might also be used. In addition to the foregoing details and examples, microperforation holes might also be cut using a water-based laser microjet machine, such as those that are manufactured by Synova Corporation of Lausanne, Switzerland.

In particular, all arrangements and formation methods with respect to such microperforations disclosed in these references are contemplated for use with the present invention as well. Such microperforation patterns can be formed on a surface for virtually any opaque base object where the subject visual display is desired. Although metallic surfaces are preferable, such as, for example, stainless steel, aluminum, titanium, copper, magnesium and the like, any base object that is readily amenable to the formation of such microperforations can be used.

Although the use of a microperforated and backlit display is typically quite aesthetically pleasing to a user, there is typically no perceptible display or item when the light source is turned off. Although this may be preferable for some applications, it may be desirable for the backlit display item to be seen in some way even when the light source is turned off. For example, a logo or other trademark can be an item that a manufacturer might want on display at all times. Of course, a wide variety of other instances can also exist, such as advertisements, disclaimers and other text, for example. In such instances, it is desirable that the microperforated and backlit display have alternative display capabilities when the backlight source is turned off.

Referring first to FIG. 1A, an exemplary laptop personal computer in a closed position and having a logo on its cover is shown in top plan view. Laptop computer 10 can be, for example, a MacBook® laptop computer, although other brands and models of laptop computers are contemplated for use with the present invention. As shown, laptop computer 10 includes a top cover 11 that includes a visual display 100 in the shape of the Apple® logo. Visual display 100 can be, for example, a microperforated and backlit display having a different surface finish than the rest of top cover 11, as described in greater detail below.

Figure 1B:
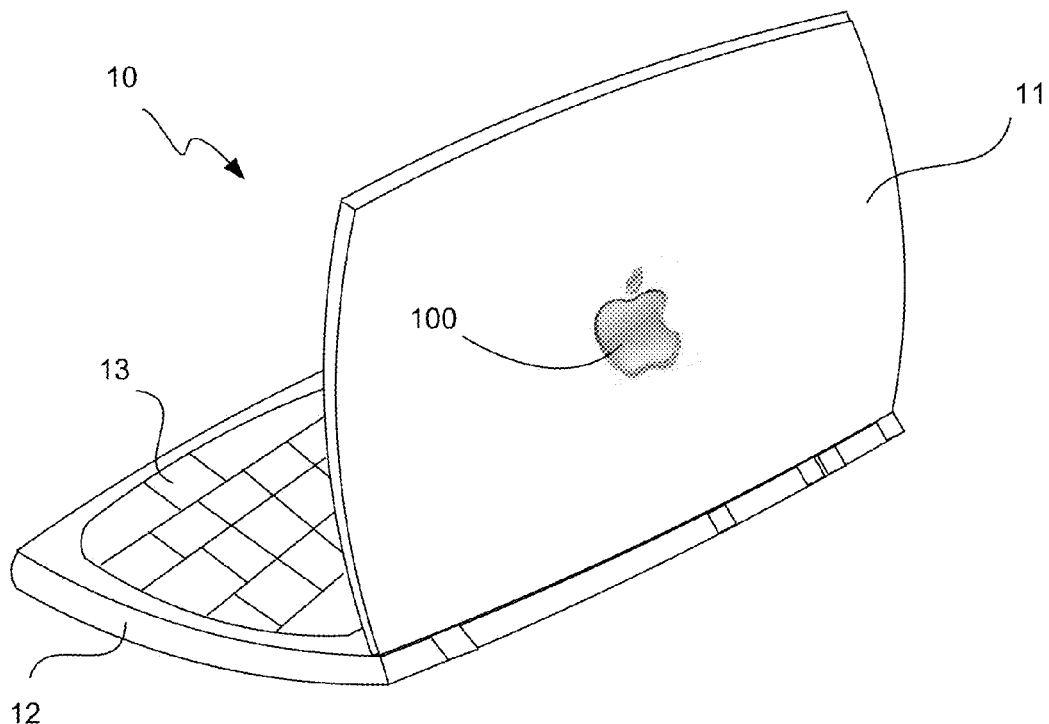
FIG. 1B illustrates in side perspective view the exemplary laptop computer of FIG. 1A in an open position according to one embodiment of the present invention.

FIG. 1B illustrates the same exemplary laptop computer as depicted in FIG. 1A, only in an open position and in side perspective view. Laptop computer 10 can have a top cover 11, as well as a lower portion 12 that may include a keyboard 13. Again, top cover 11 can include a visual display 100, such as the Apple® logo shown. Although visual display 100 is in the form of a logo, it will be readily appreciated that a wide variety of shapes, sizes and types of visual displays may be used, and that such displays can be logos, trademarks, text, advertisements, or other general types of patterns or displays. Again, visual display 100 can comprise a pattern of numerous microperforations formed in the material of the top cover 11.

Figure 1C:
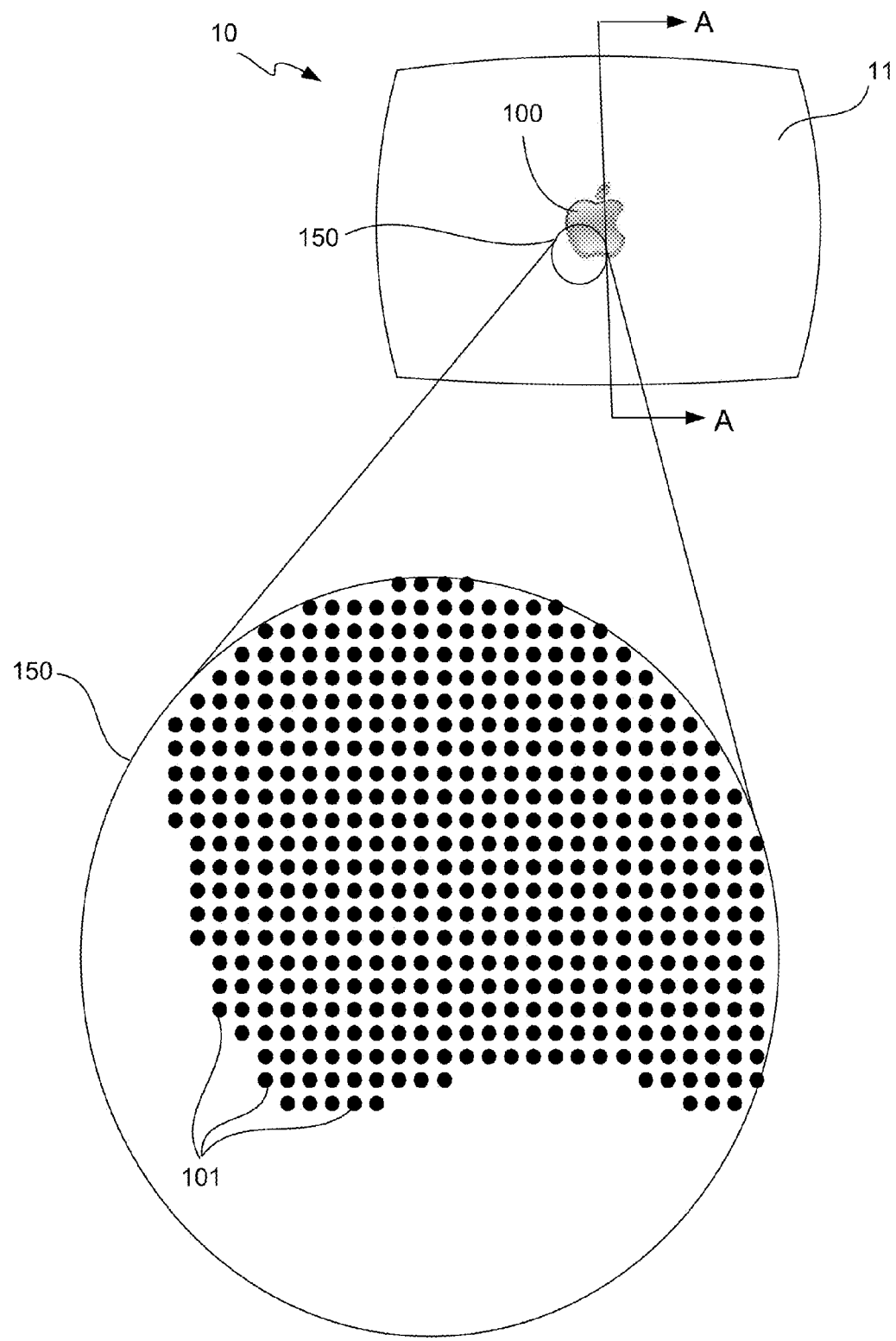
FIG. 1C illustrates a closeup and partially cutaway view of the logo on the exemplary laptop computer cover of FIG. 1A according to one embodiment of the present invention.

Continuing to FIG. 1C, the visual display (i.e., logo) of FIGS. 1A and 1B is shown in closeup and partially cutaway view, in order to accentuate the existence of the microperforations. Closeup portion 150 of top cover 11 is the view that actually depicts the various microperforations 101 forming the visual display 100. As shown, visual display 100 is formed in the shape of the Apple® logo, although this display can alternatively be any other logo, trademark, text, advertisement, and/or other general overall pattern. This visual display 100 is formed from a collection of multiple microperforations, which can range from a few to dozens, hundreds or even thousands. As noted in the '833 and '988 patent applications referenced above, such a microperforation field or pattern can be made visible on one side by providing a light source on another side.

Figure 2:
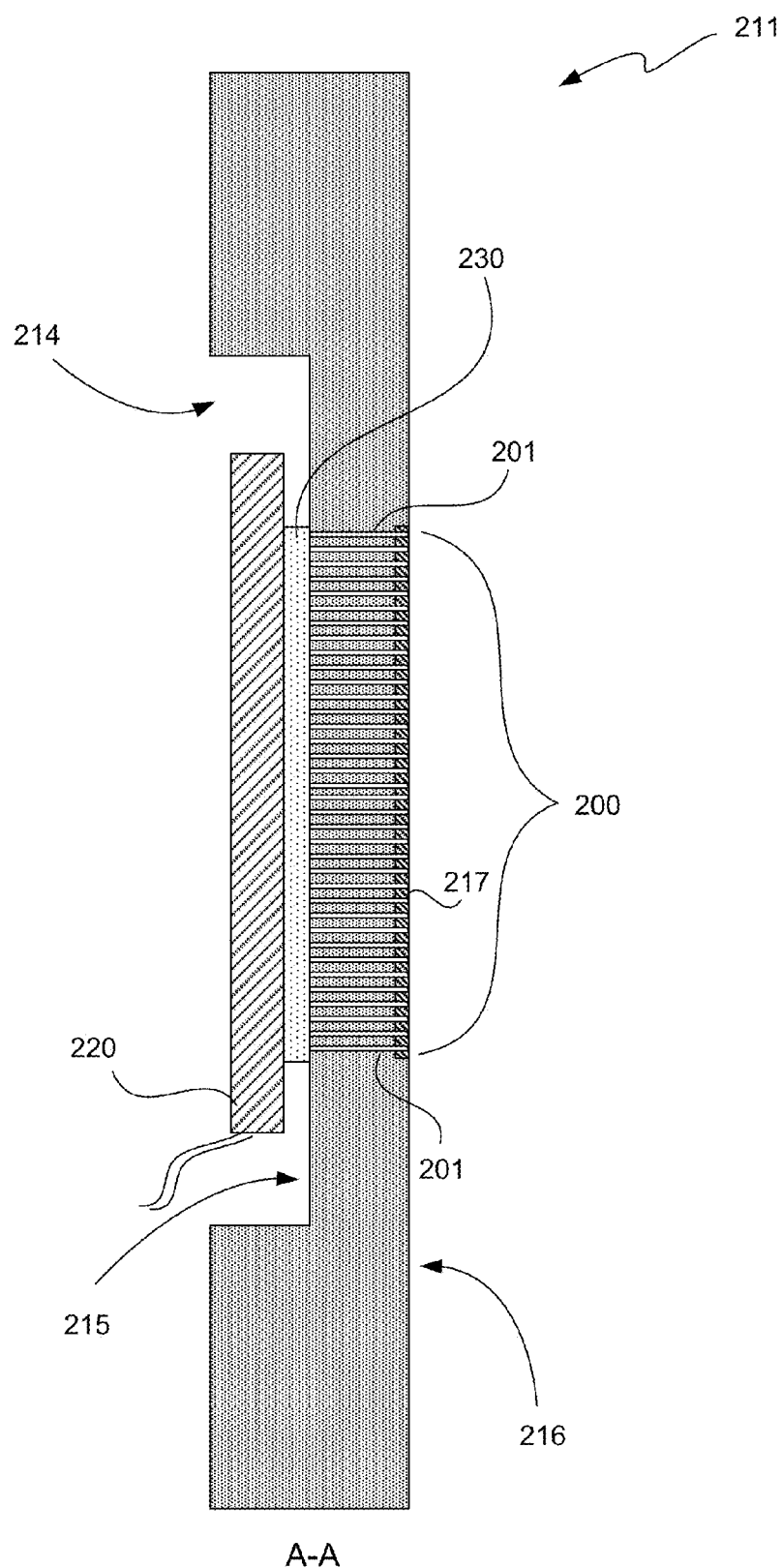
FIG. 2 illustrates in side cross-sectional view an exemplary base object formed from aluminum and having a microperforated backlit visual display according to one embodiment of the present invention.

Turning next to FIG. 2, an exemplary base object formed from aluminum and having a microperforated and backlit visual display according to one embodiment of the present invention is shown in side cross-sectional view. Here, the base object is an aluminum electronic device housing or cover 211, or at least the portion thereof containing a microperforation pattern 200 that includes a plurality of holes or microperforations 201 that extend from a back surface 215 to a front surface 216 of the base object 211. A light source 220 on the backside of cover 211 can be partially inset into a cavity 214 formed in the backside of the cover, as shown, and can be any of a wide variety of light sources, such as, for example, a light emitting diode, a liquid crystal element, an electroluminescent light, or any other suitable light source for such a purpose. An optically clear double-sided adhesive 230 can be used to affix the light source 220 to the back surface 215, such that light can be passed through the adhesive. Various thicknesses for the aluminum cover or other base object 211 can be used, although it is thought that a thickness of about 0.8 millimeters works well for laptop computer applications. Alternative applications may lend themselves to different thicknesses depending upon circumstances, as will be readily appreciated. For example, a thickness of about 0.5 millimeters might be preferable for a smaller item, such as for an iPod®, iPhone®, or other media player or cellular telephone. Although the base object has been described herein with respect to various electronic devices, it will be understood that the inventive microperforated and backlit display can be used for other non-electronic device applications as well.

An additional inset or cavity dimension of about 0.3 millimeters can be used for placement of the light source, as desired. Formation of such an inset or cavity can be made through any of a variety of suitable methods, such as, for example, a localized etching or machining process in the metal. Performing such a "thinning" of the top cover or other suitable housing component prior to the formation of the microperforations can also aid in the formation of such microperforations, since the formation thereof can often be easier for a thinner material. In addition, the front display surface 201 where the backlit logo is viewable can be anodized, plated or otherwise treated in a variety of ways, as disclosed herein. For example, specially anodized region 217 of display surface 201 can correspond to or work in conjunction with microperforation pattern 200, as set forth in greater detail below. Anodized region 217 presents a surface finish that is visibly distinct from the surface finish or finishes of the rest of display surface 201.

Figure 3:
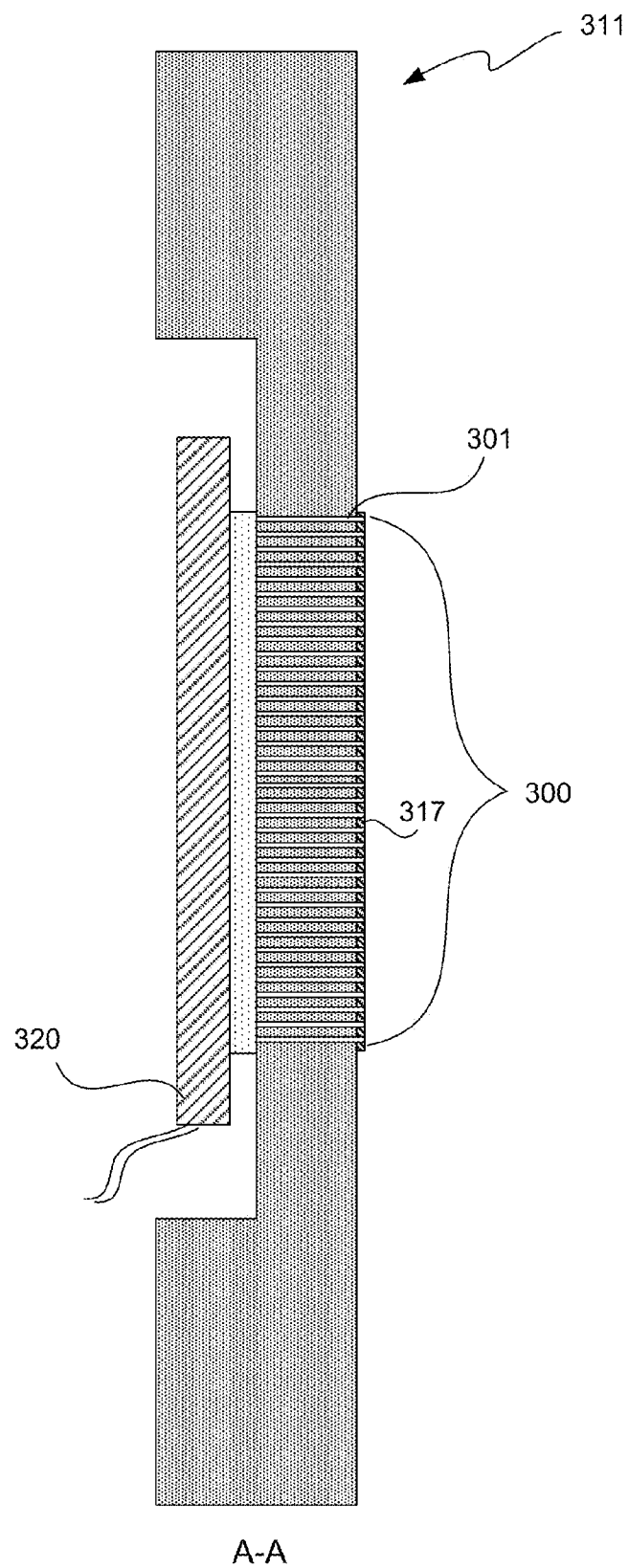
FIG. 3 illustrates in side cross-sectional view an exemplary base object formed from stainless steel and having a microperforated backlit visual display according to an alternative embodiment of the present invention.

An alternative formation of a microperforated and backlit logo or other visual display pattern can be seen in FIG. 3, which illustrates in side cross-sectional an exemplary base object formed from stainless steel according to one embodiment of the present invention. Similar to the foregoing example, the base object can be a stainless steel housing, cover or other component 311, or at least the portion thereof containing a microperforation pattern 300 having a plurality of microperforations 301. The light source 320 can be the same or similar to that of the embodiment shown in FIG. 2, and the dimensions can be the same or similar to the foregoing embodiment. As another example, the thickness of the stainless steel cover can be about 0.5 millimeters, although such a thickness can vary widely, as desired. One difference between the above exemplary embodiment involving an aluminum cover and this exemplary embodiment involving a stainless steel cover can be the surface treatments to the front surface of the cover, as discussed in greater detail below. For example, a specially plated region 317 may be used to correspond to the microperforation pattern 300, rather than a specialized anodization of the front display surface.

Figure 4:
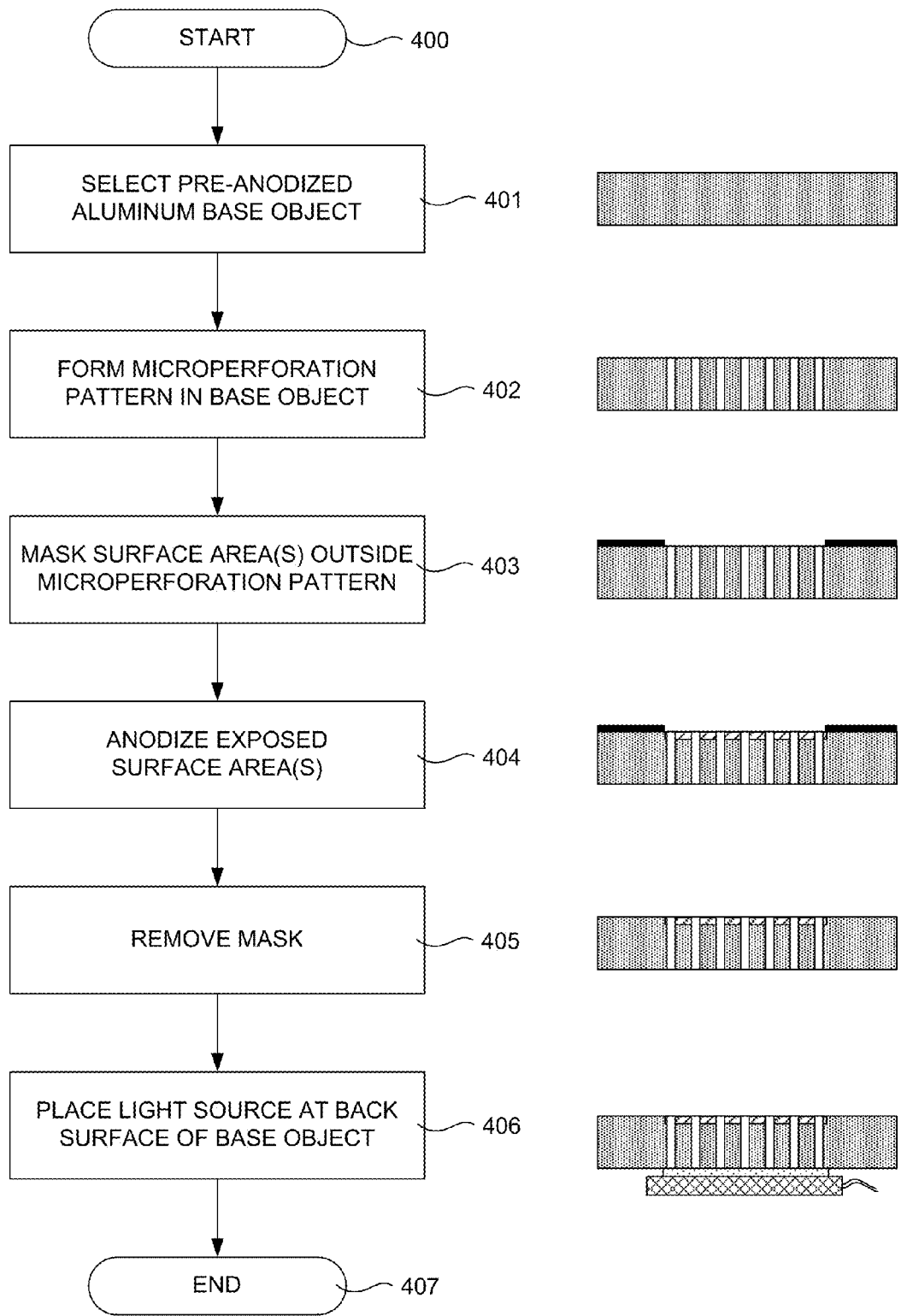
FIG. 4 depicts a flowchart of an exemplary method of forming a microperforated backlit display having alternative display capabilities on an aluminum base object according to one embodiment of the present invention.

Continuing now to FIG. 4, a flowchart is provided for one exemplary method of forming a microperforated backlit display having alternative display capabilities on an aluminum base object according to one embodiment of the present invention. It will be understood that the provided steps are shown only for purposes of illustration, and that many other steps may be included in the process, as may be desired. Furthermore, the order of steps may be changed where appropriate and not all steps need be performed in various instances. After a start step 400, a first process step 401 involves selecting a base object composed of an opaque material, such as aluminum. The aluminum base object should have a front surface and a back surface on opposing sides thereof, with the front surface being adapted for presenting a visual display thereupon. The aluminum object can be, shaped in the form of a housing component for an electronic device, such as, for example, a top cover for a laptop computer or a back portion of a media player or cellular telephone. In some embodiments, the aluminum base object can be pre-anodized aluminum.

Next, at process step 402, a plurality of microperforation holes can be formed in the base object (e.g., aluminum housing component), such that light is able to pass through from the front surface to the back surface. As noted above, each of these plurality of microperforations can have a diameter of about 100 microns or less, and preferably have a diameter of 30 microns or less so as to be invisible to the naked eye of most observers. These microperforations can be formed into an overall pattern, such as a logo, trademark, text, advertisement or other suitable arrangement.

At process step 403, a mask is placed over the front surface such that generally only the microperforated region is exposed. As such, the mask is arranged such that it covers a significant amount of the front surface that lies outside the overall pattern formed by the microperforations. Of course, exceptions to this general arrangement may apply as desired. For example, extra holes or openings in the mask can be made in other locations on the front surface, such as to provide markings for text or other designations. Alternatively, some variations between the masked pattern and the microperforation pattern can be designed intentionally to add greater visual effect. At process step 404, the portion of the front surface that exposed by the mask is anodized, with such anodization not effecting those regions that are covered by the mask. As a result, the exposed portion that includes the region substantially defined by the overall microperforation pattern will be visible different than the region that was masked for anodization. Process step 405 involves removing the mask to reveal the front surface having at least two visibly different surface finishes.

At subsequent process step 406, an electroluminescent light or other suitable light source is placed proximate to the back surface such that light from the light source passes through the microperforations and is visible to a user viewing the front surface. The light source can be affixed to the base object itself, or can be positioned proximate the microperforations via any other suitable positioning method, such as by attachment to an adjoining component. The overall result is that a user can visibly perceive light from the light source forming an overall pattern when the light source is turned on due to the microperforations, and can also visibly perceive the overall pattern when the light source is turned off due to the visibly different surface finishes as a result of anodizing the surface using a mask. After process step 406, the method then ends at end step 407.

Although the disclosed method only provides for one masking and one anodizing step, it is also contemplated that a second anodizing step for a more striking visual contrast can also be used. Such a second anodizing step may or may not be used with a mask. For example, an additional "primer" anodizing step may be performed on the entire display surface, such as between steps 402 and 403, with no masking. The anodizing done in step 404 could then be done differently on just the unmasked region, such that its different anodized finish will contrast with the original anodized finish under the masked portions of the display surface.

Such a "double anodizing" process can result in light and dark contrasting finishes, such as, for example, a black and silver finish. As will be readily appreciated, one of the shades or colors can be made only on the surface portion that corresponds to the microperforated logo or pattern, while the other shade or finish can be made on all other regions outside the logo or pattern. In this manner, the logo or pattern will be visible even when the light source is turned off, due to the contrasting finishes on the display surface itself. Further anodizing and/or masking steps can be added as desired to create visible contrasts in three or more visibly different shades. A different luminescent display can then be perceived through the microperforations when the light source is turned on. As will also be readily appreciated, the light source can be simple and constant in any color, or it can change to and from any of a variety of colors. Additional light effects, such as a pulse or strobe, may also be used for the light source, as may be desired.

Figure 5:
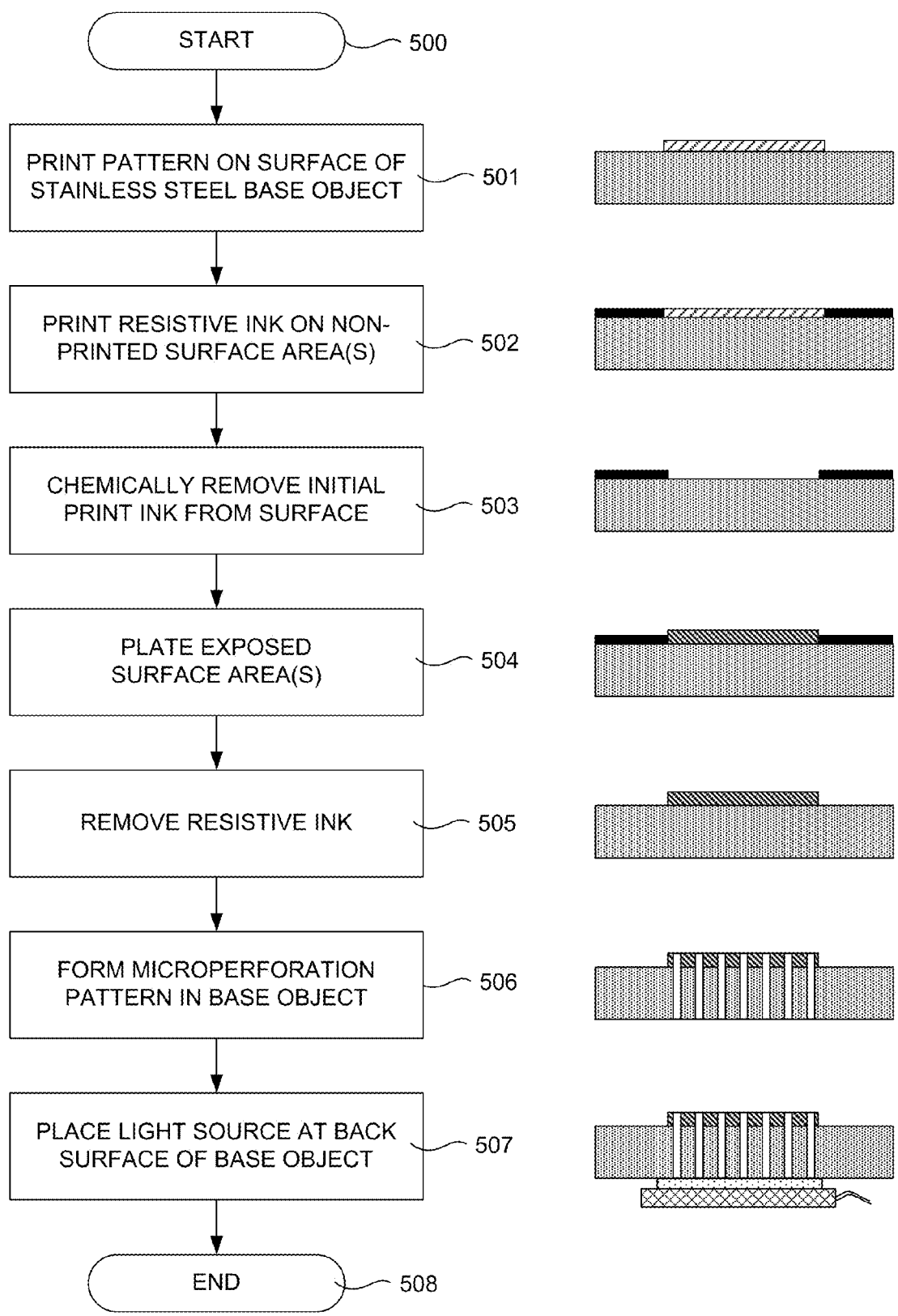
FIG. 5 depicts a flowchart of an exemplary method of forming a microperforated backlit display having alternative display capabilities on a stainless steel base object according to an alternative embodiment of the present invention.

FIG. 5 depicts a flowchart of an exemplary method of forming a microperforated backlit display having alternative display capabilities on a stainless steel base object according to one embodiment of the present invention. Again, it will be understood that the provided steps are shown only for purposes of illustration, and that many other steps may be included in the process, as may be desired. Again, the order of steps may be changed where appropriate and not all steps need be performed in various instances. After a start step 500, a first process step 501 involves selecting a base object composed of an opaque material, such as stainless steel, and then printing a pattern on a front or display surface thereof. Similar to the foregoing example, the stainless steel object can be shaped in the form of a housing component for an electronic device, such as, for example, a top cover for a laptop computer or a back portion of a media player or cellular telephone.

Next, at process step 502, a print resistant ink can be placed on the non-printed front surface portions from step 501. At subsequent process step 503, the print ink can then be chemically removed from the front surface, with this process leaving the print-resistive ink behind. Next, at process step 504, the front surface can be plated, with such a plating affecting only the region of the surface that has been exposed due to the removal of the print ink. Regions of the surface still covered by the print resistive ink are preferably unaffected by this plating process. As in the foregoing embodiment, variations in the pattern for the print ink and print-resistive ink can be implemented as may be desired to allow for additional images, text, and/or other visual effects in the final product.

At process step 505, the print-resistive ink is removed, exposing the original unplated surface region or regionss alongside the now plated surface region or regions, with such plated regions substantially forming a logo or other pattern. Microperforation holes can then be formed through the base object (e.g., stainless steel) and plating at process step 506. Again, such microperforations can be formed in an overall pattern, such as a logo, text or advertisement, for example. Preferably, the microperforation pattern substantially matches and overlaps the pattern created by the selective plating steps above.

Finally, at subsequent process step 507, an electroluminescent light or other suitable light source is placed proximate to the back surface such that light from the light source passes through the microperforations and is visible to a user viewing the front surface. Again, this light source can be affixed to the base object itself, or can be positioned proximate the microperforations via any other suitable positioning method, such as by attachment to an adjoining component. Similar to the foregoing embodiment, the overall result is that a user can visibly perceive light from the light source forming an overall pattern when the light source is turned on due to the microperforations, and can also visibly perceive the overall pattern when the light source is turned off due to the selective plating process steps above. After process step 507, the method then ends at end step 508.

As will be readily appreciated, various plating and/or ink printing steps and techniques can be used in this stainless steel base object embodiment in place of the anodizing steps and techniques used in the aluminum embodiment above. In some embodiments, various anodizing, ink printing and/or plating processes may all be used on the display surface, as desired. Similar to the anodizing example above, although the disclosed method only provides for a single plating step, it is also contemplated that a second plating step for a more striking visual contrast can also be used. Such a second plating step may or may not be used with a mask. For example, an first plating step may be performed on the entire display surface, such as before step 1, with no ink masking. The remainder of the process could then be performed, with the result being two contrasting platings.

Again, additional process steps may be added, as may be desired. Such steps may include filling the microperforations with a clear epoxy, so as to permit the passage of light, yet avoid the clogging of these tiny physical holes with contaminants or the passage of any fluids or spilled liquids therethrough. Further, the affixing of the light source may involve placing an optically clear double-sided adhesive against the back surface of the base object, up against and across the microperforations, and then affixing the light source directly to the adhesive. Further process steps may involve the customized shaping of the backside of the base object, such as to machine or etch the back side to create a cavity for locating the light source or sources.

Although the two exemplary embodiments disclosed herein involve aluminum and stainless steel as the base object for the visual display, it will be readily appreciated that other metals can also be used for this item, and for the various plating and/or anodizing steps provided herein. Furthermore, other materials may also be used for a base object, as may be appropriate. For example, a hardened opaque plastic suitable for the formation of microperforations can be used. In such instances, differing colors or shades on the surface of the plastic can be built into the plastic as part of the manufacturing process for the base object. Microperforation holes might then be formed in the hard plastic to conform with the visual pattern that is already there. Other materials suitable for microperforation formation may also be used.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Although the present invention has been described primarily with respect to housings for electronic devices, it will be appreciated that other non-electronic objects can be incorporated with the present invention. For example, various inventive microperforated and backlit displays disclosed herein can be made with respect to a region on the body of an automobile or other vehicle. Certain changes and modifications may be practiced, and it is understood that the invention is not to be limited by the foregoing details, but rather is to be defined by the scope of the appended claims.

What is claimed is:

1. An electronic device, comprising:
   an outer housing adapted to contain one or more internal electrical device components therein, wherein said outer housing includes an opaque portion having a front surface and a back surface on opposing sides thereof;
   a processor located within said outer housing; and
   a visual display located on said opaque portion of said outer housing, wherein said visual display includes:
      a plurality of microperforations therethrough from said front surface to said back surface, wherein each of said plurality of microperforations has a diameter of about 100 microns or less;
      a light source positioned such that light from said light source passes through said plurality of microperforations and is visible to a user viewing said front surface; and
      a contrasting surface finish formed on said front surface, said contrasting surface finish having a plurality of visually distinguishable shades arranged such that said user can visibly perceive an overall pattern that corresponds to said plurality of microperforations when said light source is turned off.

2. The electronic device of claim 1, wherein each of said plurality of microperforations has a diameter of about 50 microns or less.

3. The electronic device of claim 2, wherein each of said plurality of microperforations has a diameter of about 30 microns or less.

4. The electronic device of claim 1, wherein said overall pattern comprises a logo.

5. The electronic device of claim 1, wherein said opaque portion comprises a metal.

6. The electronic device of claim 1, wherein at least a portion of said plurality of microperforations are filled with a clear epoxy material.

7. The electronic device of claim 1, wherein said light source is selected from the group consisting of a light emitting diode, a liquid crystal element, and an electroluminescent light.

8. The electronic device of claim 1, wherein said light source is adapted to change colors while light is continuously emitted therefrom.

9. The electronic device of claim 1, wherein said electronic device is selected from the group consisting of a laptop computer, a personal computer, a media player and a cellular telephone.

10. The electronic device of claim 1, wherein said plurality of microperforations are substantially straight in nature.

11. A method of providing a visual display, comprising:
    selecting a base object including a region of opaque material having a front surface and a back surface on opposing sides thereof, a plurality of microperforations therethrough such that light is able to pass from said front surface to said back surface, said plurality of microperforations being arranged in a first pattern, and wherein said front surface includes a contrasting surface finish having a plurality of visually distinguishable shades arranged in a second pattern that corresponds to said first pattern;
    positioning a light source proximate to said back surface such that light from said light source passes through said microperforations and is visible to a user viewing said front surface;
    turning said light source on such that the user can visibly perceive said first pattern due to light shining through said plurality of microperforations; and turning said light source off such that the user can visibly perceive said second pattern due to the contrasting surface finish.

12. The method of claim 11, wherein each of said plurality of microperforations has a diameter of about 100 microns or less.

13. The method of claim 11, further including the step of: providing said visual display at an outer surface region of an electronic device.

14. The method of claim 13, wherein said electronic device is selected from the group consisting of a laptop computer, a personal computer, a media player and a cellular telephone.

15. A visual display, comprising:
a base object composed of a non-transparent material and having a front surface, a back surface, and a plurality of microperforations therethrough from said front surface to said back surface, wherein said plurality of microperforations are arranged into a first pattern;
a light source placed proximate to said back surface such that light from said light source passes through said microperforations and is visible at said front surface such that said first pattern can be visibly perceived when said light source is turned on; and
a contrasting surface finish formed on said front surface, said contrasting surface finish having a plurality of visually distinguishable shades arranged such that said user can visibly perceive a second pattern that corresponds to said first pattern when said light source is turned off.

16. The visual display of claim 15, wherein each of said plurality of microperforations has a diameter of about 100 microns or less.

17. The visual display of claim 15, wherein said overall pattern comprises a logo.

18. The visual display of claim 15, wherein at least a portion of said plurality of microperforations are filled with a clear epoxy material.

19. The visual display of claim 15, wherein said light source is adapted to change colors while light is continuously emitted therefrom.

20. The visual display of claim 15, wherein said plurality of microperforations are substantially straight in nature.

* * * * *